G. S. GOODWIN.

END REINFORCEMENT FOR BOX CARS.

APPLICATION FILED DEC. 21, 1918.

Reissued Feb. 4, 1919.

14,588.

3 SHEETS—SHEET 1.

Witnesses:

W. P. Kilroy

Harry R. L. White

Inventor.

George S. Goodwin

By Barnett & Duncan

Atty.

G. S. GOODWIN.

END REINFORCEMENT FOR BOX CARS.

APPLICATION FILED DEC. 21, 1918.

Reissued Feb. 4, 1919.

14,588.

3 SHEETS—SHEET 2.

Witnesses:

W. P. Kilroy

Harry R. L. White

Inventor:

George S. Goodwin

By Barnett & Ullman

Attys.

G. S. GOODWIN.

END REINFORCEMENT FOR BOX CARS.

APPLICATION FILED DEC. 21, 1918.

Reissued Feb. 4, 1919.

14,588.

3 SHEETS—SHEET 3.

Witnesses:

W. L. Kilroy

Harry R. L. White

Inventor:

George S. Goodwin

By Barnett & Ullman

Attys

UNITED STATES PATENT OFFICE.

GEORGE S. GOODWIN, OF CHICAGO, ILLINOIS, ASSIGNOR TO WALTER P. MURPHY, OF CHICAGO, ILLINOIS.

END REINFORCEMENT FOR BOX-CARS.

14,588. Specification of Reissued Letters Patent. Reissued Feb. 4, 1919.

Original No. 1,282,568, dated October 22, 1918, Serial No. 86,402, filed March 24, 1916. Application for reissue filed December 21, 1918. Serial No. 267,856.

*To all whom it may concern:*

Be it known that I, GEORGE S. GOODWIN, a citizen of the United States, residing at Chicago, in the county of Cook and State of Illinois, have invented certain new and useful Improvements in End Reinforcements for Box-Cars, of which the following is a specification.

My invention relates to railway box cars, more particularly cars of wood construction, and one of the principal objects of the invention is to provide certain reinforcing means for strengthening the car against cargo thrusts and other shocks and impacts from within and from without to which the end wall of a railway car is liable when the car is in service.

A further object of the invention is to rigidify the end framing of the car as against weaving and other like stresses which tend to rack and ultimately destroy the superstructure and roof of a box car.

A further object is to provide an end reinforcement for a box car of wood construction which can be readily applied in repairing old cars as well as in the construction of new cars.

A further object is to provide reinforcing means of the general character above described which will give a maximum of strength and rigidity with a minimum increase of weight.

A further object is to arrange vertical, or substantially vertical, reinforcing members on the outside of the car which will be so disposed as not to violate the provision of the Interstate Commerce Commission with reference to end ladder clearance; the placing of such members on the outside of the car having the advantage that the effective inside length of a car is not thereby diminished.

With the above stated objects in view, my invention consists in the arrangements, constructions and devices to be hereinafter described and claimed.

The invention is illustrated, in a preferred embodiment, in the accompanying drawings, wherein—

Figure 5:
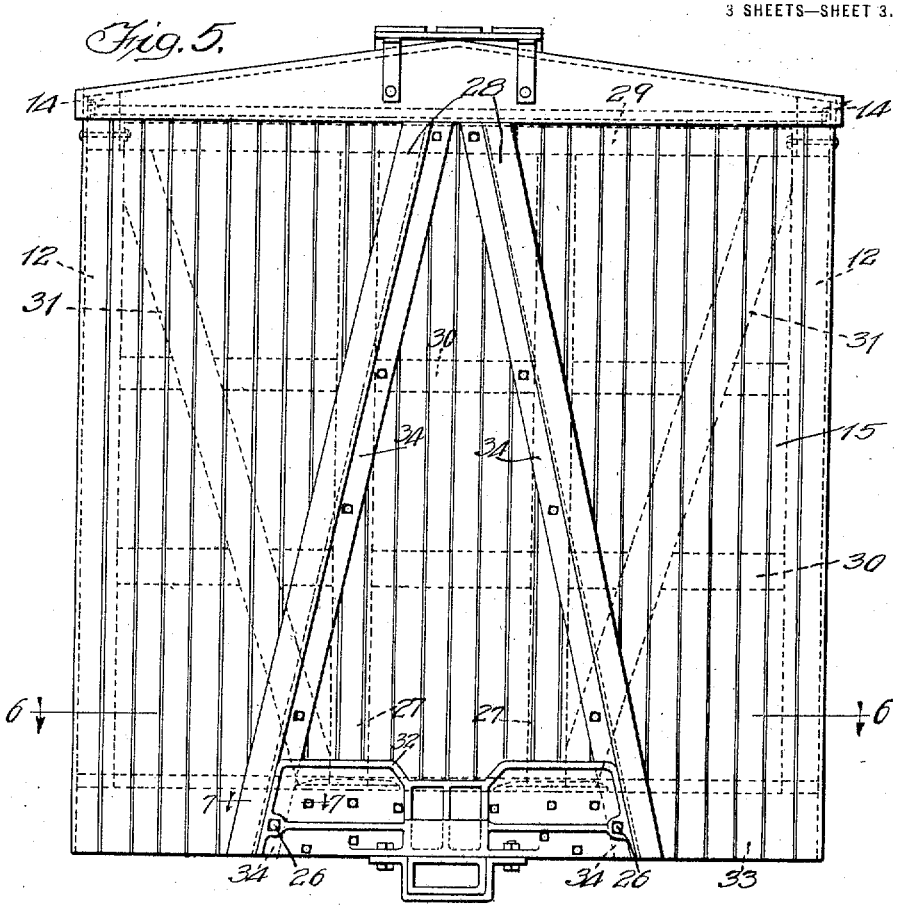
Fig. 5 is a view, in elevation, showing a modified construction.
Figure 6:
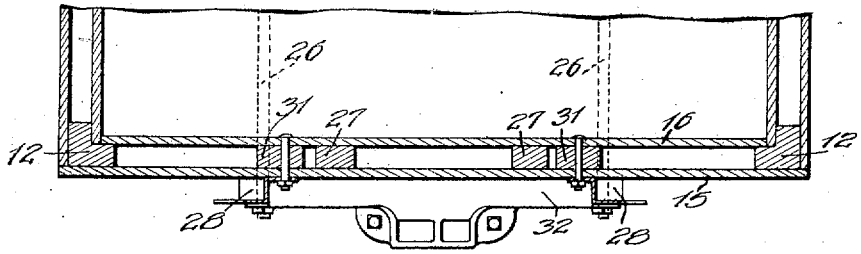
Figure 7:
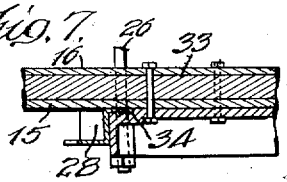

Figs. 6 and 7 are sectional views on lines 6—6 and 7—7, respectively, of Fig. 5.

Like characters of reference indicate like parts in the several figures of the drawings.

In the drawings, 10 indicates the end sill at one end of the car, 11 the end plate, 12, 12 the corner posts, 13, 13 the usual end posts intermediate the corner posts, 14, 14 the side plates, 15 the outer end sheathing, and 16 the inner end sheathing or lining, the sheathings, in the construction shown, being both of wood, although that is not essential.

In order to strengthen the end wall and rigidify the end of the superstructure of the car as a whole, vertical or substantially vertical reinforcing members 17 are arranged on the outside of the car parallel with the end posts 13 and bolted thereto by bolts 18, these bolts serving also to secure the inner lining 16 in place against the end posts 13 and the usual end girths 19 of the end framing. I have shown a car of standard wood construction. It will be obvious, however, that the reinforcing structure of my invention might be used in connection with cars not constructed precisely as shown.

These reinforcing members are angular in cross-section. Preferably they are Z-bars. Although they project out from the sheathing of the car, they stand close enough to the vertical center line of the end that they do not violate the regulation of the Interstate Commerce Commission with reference to end ladder clearance. Therefore, being on the outside, the reinforcement, as described, does not necessitate any shortening of the car body.

The lower ends of the reinforcing members 17 are preferably anchored to the framing of the car by means of the truss rods 20 which extend through the under frame ordinarily from end to end of the car. The upper extremities of the reinforcing members are secured to the end plate 11 by bolts 21. These same bolts may be employed for attaching to the end plate of the car a horizontally arched steel reinforcement 22 preferably consisting of a single rolled steel element angular in cross section, the middle portion 23 of which lies flatwise against the end plate and the extremities or corner brace members 24 of which are bent so as to extend diagonally across the corners of the car to the side plates 14 of the car to which they are attached by bolts 25. The structure is preferably further rigidified and strengthened by tension rods 25ª which extend across the upper part of the car from one side plate to the other. The vertical reinforcing members 17, the horizontally disposed arched brace 22, structurally united to the upper ends of the reinforcing members, and the truss rods 20 which anchor the lower ends of the reinforcing members of the car framing together constitute a reinforcing structure of a unitary character which, besides giving the end of the car greater capacity for resisting cargo thrusts and like shocks and impacts, serves also to greatly stiffen and rigidify the end of the car superstructure as a whole more particularly against the racking or weaving strains to which railway box cars are subject because of the various swinging or swaying movements of the cars, for example, in rounding curves or resulting from the inequalities of the track. The extremities of the reinforcing member 22 are attached to the side plates 14 close to one of the roof carlines 14ª, which latter forms a strut or compression member between the side plates, preventing the side plates from being drawn in by the reinforcing member 22 when the cargo exerts an outward thrust against the end of the car. The upper ends of the vertical reinforcing members or end wall braces 17 are of substantial thickness or depth in the direction longitudinally of the car, that is, at the places where they are attached, through the end plate, to the interior horizontal end plate brace 22 and the end wall braces project, more or less, above said end plate brace so that the unitary character of the reinforcing structure as a whole, as just referred to, is insured; the interior end plate brace cooperating with the exterior end wall braces to strengthen and stiffen the end framing of the car against the effect of cargo thrusts and against the racking or weaving strains which are so destructive of box cars of wood construction. The outwardly projecting webs of the Z section end wall braces give the braces strength and stiffness throughout their length to resist the thrusts and stresses to which they are subjected. This reinforcing structure may be readily applied to old cars as well as new ones. If any of the parts are injured, they may be easily replaced without disturbing the other parts of the car structure.

Figure 1:
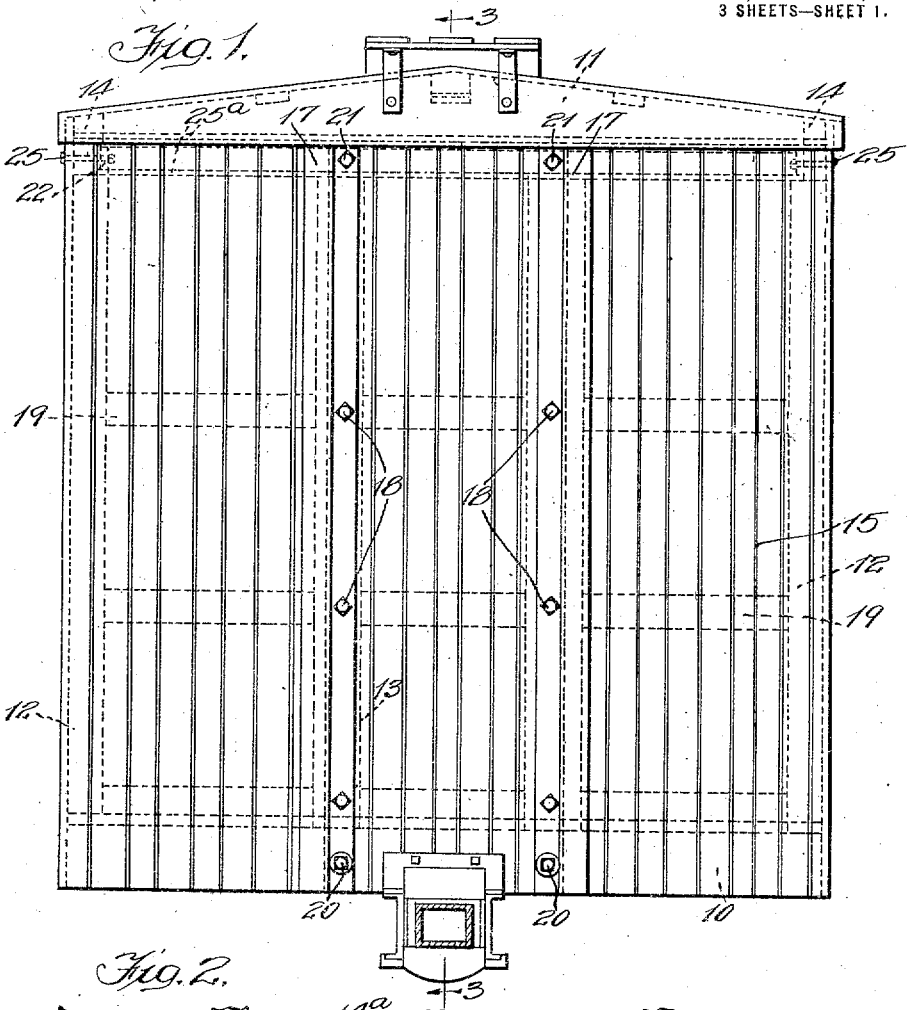
Figure 1 is an end elevation of the superstructure of a railway box car of standard wood construction.
Figure 2:
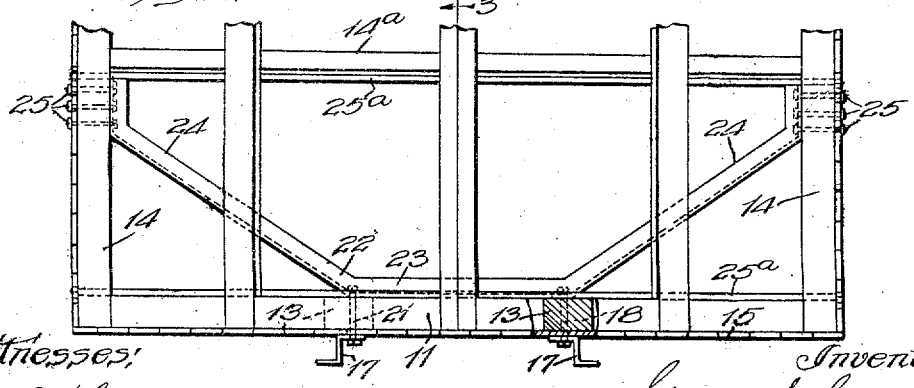
Fig. 2 is a top plan view of the end of the car showing the roof boards removed and certain parts of the framing and sheathing in section.
Figure 3:
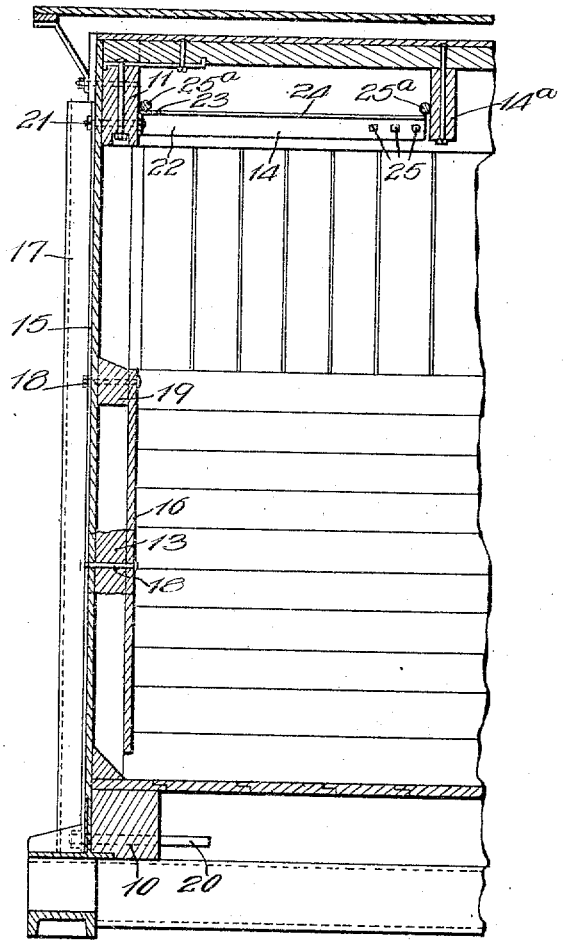
Fig. 3 is a vertical sectional view on line 3—3 of Fig. 1.
Figure 4:
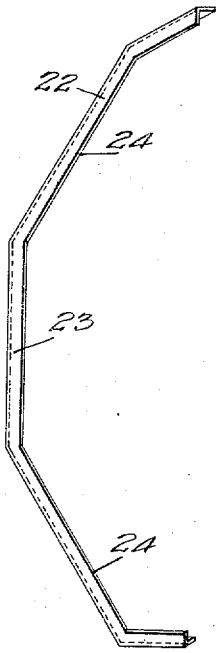
Fig. 4 is a view, in perspective, of the inner bracing member forming, preferably, a part of the reinforcing structure of my invention.

In some cars the truss rods are not in line with the end posts. For example, it happens not infrequently that the truss rods are nearer the sides of the car than the end posts. To meet this contingency my invention may be modified as indicated in Figs. 5 to 7, inclusive. In the car shown in these figures the truss rods 26 are nearer the sides of the car than the end posts 27. The reinforcing members 28 are anchored to the car at their lower ends by the truss rods 26. However, instead of being vertical they slant somewhat toward each other so that they cross the end posts 27 as shown. The upper ends of the reinforcing members may be anchored to the car by means of an arched brace 29 of the same sort as the brace 22 shown in the construction shown in Figs. 1 to 3 inclusive. The reinforcing members are preferably bolted or otherwise secured to the girth members 30 of the end posts 27 and to the diagonal braces 31. In order to prevent the lower ends of the end posts from being kicked out by a cargo thrust against the lower part of the end I provide a casting 32 which also serves as a buffer casting. This casting is bolted to the end sill 33 and bears against the flanges 34 of reinforcing members 28. The truss rods 26 extend through the casting as well as to the reinforcing members 28 and end sill.

I do not claim herein specifically the construction shown in Figs. 5 to 7, inclusive, as this structure is disclosed and claimed in a copending application filed March 27, 1918, Serial No. 224,951.

While I have described my invention in certain prefered embodiments, further modifications might be made without departure from the principles of the invention. Therefore I do not wish to be understood as limiting the invention to the precise constructions, devices and arrangements shown except as the claims may be so limited.

I claim:

1. In a railway car, the combination with the framing of the car comprising side plates and end posts, of metal reinforcing members on the outside of the end wall of the car secured to said end posts, and a metal bracing structure within the car secured to said reinforcing members and comprising diagonally extending members attached to the side plates at points remote from the corners of the car, said reinforcing members being formed with outwardly projecting stiffening webs which extend above the bracing structure.

2. In a railway car, the combination with the framing of the car comprising side plates and end posts, of metal reinforcing members on the outside of the end wall of the car secured to said end posts, and an integral metal brace secured to said reinforcing members at points near the middle of said brace, with its extremities bent so as to extend diagonally to the side plates of the car and anchored at the ends to said side plates, said reinforcing members being formed with outwardly projecting stiffening webs which extend above the bracing structure.

3. In a railway car, the combination with the framing of the car comprising side plates and end posts, of metal reinforcing members on the outside of the end wall of the car secured to said end posts, a metal bracing structure secured to said reinforcing members and comprising members extending diagonally from the end posts to the side plates of the car and anchored at their extremities to said side plates, and truss rods anchoring the lower ends of said reinforcing members to the underframe of the car which extend longitudinally of the under frame, said reinforcing members formed with outwardly projecting stiffening webs which extend above the bracing structure and below the points of anchorage of the truss rods.

4. In a railway car, the combination with the framing of the car comprising side plates and end posts, of metal reinforcing members on the outside of the end wall of the car secured to said end posts, a metal bracing structure secured to said reinforcing members and comprising members extending diagonally from the end posts to the side plates of the car and anchored at their extremities to said side plates, said reinforcing members formed with outwardly projecting stiffening webs which extend above the bracing structure, and a transverse tension rod extending from side plate to side plate adjacent the ends of said brace.

5. In a railway car, the combination with the framing of the car comprising side plates and end posts, of metal reinforcing members angular in cross section on the outside of the end wall of the car secured to said end posts, and a metal bracing structure angular in cross section secured to said reinforcing members at points near the middle of said brace, with its extremities extending and attached to the side plates.

6. In a railway car, the combination with the framing of the car comprising side plates and end posts, of metal reinforcing members angular in cross section on the outside of the end wall of the car secured to said end posts, and an integral metal brace angular in cross section secured to said reinforcing members at points near the middle of said brace, with its extremities bent so as to extend diagonally to the side plates of the car and anchored to said side plates.

7. In a railway car, the combination with the framing of the car comprising side plates and end posts, of metal reinforcing members on the outside of the end wall of the car secured to said end posts, a metal brace secured to said reinforcing members at points near the middle of said brace, with its extremities extending and attached to the side plates, and truss rods extending longitudinally of the car which anchor the lower ends of said reinforcing members to the under frame of the car, said reinforcing members being formed with outwardly projecting stiffening webs which project above and below, respectively, the points of attachment of said reinforcing members to the metal brace and to the underframe of the car.

8. In a railway car, the combination with the framing of the car comprising side plates and an end plate, of a metal bracing structure, the middle portion of which lies against the end plate and is anchored thereto, said structure being provided with angularly disposed portions which extend from the end plate to the side plates and are secured at their extremities to said side plates, and substantially upright end braces on the outside of the car, the upper ends of which are secured to said bracing structure through the end plate, said end braces being formed with outwardly projecting webs which extend above the bracing structure.

9. A reinforcing structure for the end wall of a box car, comprising a pair of substantially upright end reinforcing members on the outside of the wall of the car having outwardly projecting stiffening webs of substantial width extending to their upper extremities, and a substantially horizontal arched bracing structure within the car attached at the middle to the reinforcing members and at its extremities to the opposite sides of the car framing at points remote from the corners of the car.

10. A reinforcing structure for the end wall of a box car, comprising a pair of substantially upright end reinforcing members on the outside of the wall of the car having outwardly projecting stiffening webs of substantial width extending from end to end thereof, a substantially horizontal arched bracing structure within the car attached at the middle to the upright reinforcing members and at its extremities to the opposite sides of the car framing at points remote from the corners of the car, and truss rods for anchoring the lower ends of said reinforcing members to the under frame of the car.

11. In a railway car, the combination with the framing and end wall of the car, comprising substantially vertical end posts, of reinforcing members consisting of Z-bars arranged on the outside of the car wall secured to said end posts, truss rods which anchor the lower ends of the reinforcing members to the under frame of the car, and a horizontal arched brace secured to the upper ends of the reinforcing members and to the side members of the car framing.

12. In a railway car, the combination with the end and side walls of the car, of a metal reinforcement for the same comprising a pair of substantially upright beams on the outside of the end wall, means for securing the lower ends of said beams to the under frame of the car and a metal bracing structure within the car comprising diagonally disposed members for securing the upper ends of said beams to the side walls, said beams being formed with outwardly projecting stiffening webs of substantial width which extend above and below, respectively, points of attachment of the beams to said metal reinforcement and to the under frame of the car.

13. The combination with the side plates and end wall of a railway box car, of a reinforcing and bracing member, the middle portion of which lies parallel to and is secured to the upper portion of the end wall of the car, the ends of which extend diagonally across the car and are attached to the side plates, and rolled steel beams angular in cross section, the lower ends of which are anchored to the under frame and the upper ends to said reinforcing bracing member.

14. The combination with the end wall sheathing, end plate and side plates of a railway box car, of reinforcing means for the end plate comprising diagonal brace members extending across the corners of the car and rigidly anchored to the end plate near the middle thereof and side plates at points remote from the corners of the car, and end braces on the outside of the car angular in cross section, the upper ends of which are secured to said reinforcing means through the end plate, and the lower ends of which are anchored to the under frame.

15. The combination with the end wall and side walls of a railway box car, of substantially upright reinforcing Z bars on the outside of the end wall and a bracing structure comprising members extending across the corners of the car and rigidly anchored to said Z-bars and to the side walls of the car at points remote from the corners of the car.

16. The combination with the side plates and end wall of a railway box car, of a reinforcing structure which is attached to the upper part of the end wall with its extremities anchored to the side plates at points remote from said end wall, and a carline interposed between the side plates at points adjacent the extremities of said reinforcing structure so as to act as a compression member as against the tendency of the side plates to be drawn together when an outward stress is exerted against the inside of the end wall.

17. In combination in a car having side and end plates, a rigid frame spanning from side plate to side plate and comprising diagonal members connecting the side plates to the end plate, said members being rigidly secured to the end plate and having their ends secured to the side plates, and end braces on the outside of the car of substantially uniform strength from end to end, the upper extremities of which are secured to said frame through the end plate, and the lower extremities of which are anchored to the under frame of the car, 18. In a car end construction, in combination with side plates, end plate, end sill and end posts, a pair of end braces of uniform angular cross section from end to end, each of which is secured to said end plate, sill and post, and a rigid frame secured to said end braces and to said side plates and end plate for maintaining them in rectangular alinement.

19. In combination with the end and side walls of a railway box car, of substantially upright metal reinforcing Z-bars on the outside of said end walls, means for anchoring the lower ends of said Z-bars to the under frame of the car, and reinforcing means within the car comprising members extending diagonally across the corners of the car rigidly connecting the upper ends of said upright reinforcing Z-bars to the side walls of the car at points remote from the corners of the car.

GEORGE S. GOODWIN.